United States Patent [19]

Archdekin

[11] Patent Number: 5,528,110
[45] Date of Patent: Jun. 18, 1996

[54] APPARATUS FOR CONTROL OF LOAD POWER CONSUMPTION

[76] Inventor: James M. Archdekin, 1721 Normandy Pl., Santa Ana, Calif. 92705

[21] Appl. No.: 356,837

[22] Filed: Dec. 14, 1994

[51] Int. Cl.[6] .................................................. H05B 41/16
[52] U.S. Cl. ........................ 315/276; 315/142; 315/278; 315/288; 315/291; 323/256; 323/305; 323/341
[58] Field of Search ..................................... 315/276, 278, 315/288, 291, 293, 362, 137, 139, 141, 142; 336/170, 171, 181; 323/256, 305, 341

[56] References Cited

U.S. PATENT DOCUMENTS

| | | | |
|---|---|---|---|
| 4,189,664 | 2/1980 | Hirschfeld | 315/182 X |
| 4,237,403 | 12/1980 | Davis | 315/98 |
| 4,336,490 | 6/1982 | Lewis | 323/305 |
| 4,390,814 | 6/1983 | Peek | 315/320 |
| 4,431,948 | 2/1984 | Elder et al. | 315/276 |
| 4,494,010 | 1/1985 | Donnelly | 315/195 X |

Primary Examiner—Robert Pascal
Assistant Examiner—Haissa Philogene
Attorney, Agent, or Firm—Leonard Tachner

[57] ABSTRACT

An improved voltage reduction apparatus specifically designed to overcome implementation problems of a prior art voltage reduction apparatus. The present invention is designed to overcome the problem of magnetic field flux induced harmonic distortion and heating associated with the prior art which otherwise substantially detracted from the advantageous implementation thereof. More specifically the present invention, also provides a highly advantageous apparatus for reducing voltage to a load, after first providing a full magnitude of voltage thereto by the use of an autotransformer having a series winding and a common winding disconnectable and connectable to one another by means of a relay or other equivalent switching device. However it also provides a bucking coil winding in parallel with the common winding and wound in bifilar opposed relation thereto. This bucking coil prevents harmonic distortion and heating effects of the prior art apparatus by effectively cancelling any magnetically induced voltage in the common winding. In addition, the improved apparatus of the present invention provides an additional switch or equivalent switching device which is interposed at the opposite end of the common winding in order to permit the common winding and bucking coil winding to be connected in parallel with each other, but completely disconnected electrically from the remaining portions of the circuit of the present invention in the full voltage mode.

10 Claims, 2 Drawing Sheets

APPARATUS FOR CONTROL OF LOAD POWER CONSUMPTION

BACKGROUND OF THE INVENTION

1. Field of the Invention

The present invention pertains generally to apparatus for controlling the voltage applied to a load for purposes of conserving power and more specifically, to an improved transformer apparatus for advantageously lowering the voltage applied to a load such as a bank of HID fluorescent lights after initial turn on of such lights.

2. Prior Art

The present invention constitutes an improvement over prior art U.S. Pat. No. 4,431,948, issued Feb. 14, 1984. That patent discloses a selective reduction of voltage applied to a load, such as a lighting load for purposes of reducing power consumption by utilizing an apparatus in which an autotransformer is connected is series relationship with a switching device, such as a relay. A portion of the autotransformer winding is interposed between the input and the output and an additional portion of the transformer winding is interposed between the output and the common or neutral terminal of an alternating current power system. The winding interposed between the input and the output is referred to therein as the series winding of the autotransformer and the portion of the winding interposed between the output and the common or neutral terminal is referred to therein as the common winding of the autotransformer. A relay or equivalent switching device is connected in series with the common winding so that when the relay or equivalent switching device is in its open configuration, no current can flow in the common winding and the output voltage is substantially equivalent to the input voltage, less any nominal voltage drop across the relatively low impedance of the series winding. On the other hand, when the relay or equivalent switching device is closed, the current is permitted to flow in the common winding and the autotransformer performs its normal function with the output voltage reduced relative to the input voltage in proportion to the ratio of impedance of the two windings of the autotransformer. A significant advantage of that prior art patent was the disclosure of a configuration in which it was unnecessary to break AC common and also by providing a relay or an equivalent switching device which was not in the direct path of the load current on either side of the transformer, thus allowing the use of a relay or equivalent switching device which need only handle a fraction of the actual load current. As a result, it was possible to use a relay or switching device which is smaller and far less expensive than devices of the prior art designed to carry out similar functions for reducing voltage to a load, such as a bank of lights.

However, subsequent to the issuance of the aforementioned patent, it was discovered that the disclosed circuit also suffers a significant disadvantage. This disadvantage occurred during maximum voltage application when the relay or equivalent switching device was in its open configuration, thus disconnecting the common winding of the autotransformer from the series winding of the autotransformer. More specifically, it was found that in the full voltage mode, the current through the series winding produced a significant magnetic field which induced magnetic flux saturation in the metal portion of the common winding which caused two problems. One such problem was that the magnetic field caused the common winding to produce a voltage which caused the common winding, even though disconnected electrically from the series winding, to induce harmonic distortion in the series winding which effectively reduced the amplitude of the voltage available from the series winding during the full voltage configuration. The reduction in voltage was significant, in fact significant enough to, in some cases, make it difficult or impossible to turn fluorescent or other arc type light systems "ON" during the high voltage start-up mode. Another problem associated with the magnetic flux saturation of the common winding metal structure was that it heated the metal structure of the autotransformer so significantly that it tended to destroy the insulation in the coil, which could result in catastrophic effects.

Thus, although the advantages described in the aforementioned prior art patent are significant, the then unforeseen disadvantages make it difficult if not impossible to exploit that novel power consumption reduction configuration by making it impractical to actually implement.

There is therefore a need to provide an improved apparatus for control of low power consumption which permits the realization of the advantages of the aforementioned disclosure, namely a significant reduction in the current carrying capacity required for the relay or other equivalent switching device, but which avoids the harmonic distortion and inadvertent heating affects caused by the high magnetic fields generated in the common winding during the full voltage mode of that circuit.

SUMMARY OF THE INVENTION

The present invention meets the aforementioned need by providing an improved apparatus for control of load power consumption which exploits the advantageous characteristics of the circuits described in the prior art U.S. Pat. No. 4,431,948, but which provides a remedy for the problems associated with the disadvantages described hereinabove. More specifically, although the circuit configuration of the present invention is substantially the same as that disclosed in the aforementioned prior art patent, in the preferred embodiment disclosed herein, the autotransformer is provided with an additional winding, namely a bucking coil winding which is wound in bifilar, opposite relation with the common winding of the autotransformer. This bifilar bucking coil winding is because of its opposite direction of winding, designed to cancel out all of the ill effects described earlier with respect to the unitary common winding of the prior art patent. Consequently, despite the continuing high magnetic field generated by the series winding of the autotransformer in the high voltage mode, any harmonics generated in the common winding are in effect cancelled by the equal and opposite generation of harmonics in the bucking coil. In fact, any voltage generated in the common winding as a result of magnetic effects on the common winding by the current flow through the series winding, are exactly cancelled by the equal and opposite effects generated in the bucking coil winding. As a result, no heat is generated of any significance in the metal structure of the autotransformer and harmonic distortion of the full voltage alternating current sine wave is eliminated to the point where the full voltage or virtually full voltage can be achieved in that mode, thus enabling the necessary high voltage to initiate the arc start of fluorescent lights and other such lighting which is especially conducive for use with the present invention. It will also be seen hereinafter that the single relay or equivalent switching device of the prior art patent is replaced in the present invention by a pair of such relays or equivalent switching devices which may be physically configured as a double throw, double pull switch or relay implemented as two switches, one on each end of the common winding of the autotransformer. These switches serve the same function of the single switch of the prior art patent, namely to interconnect or disconnect the common winding from the series winding, depending on the mode of operation of the apparatus, namely disconnecting the common winding when it is desired to provide a full voltage mode for start-up, for example and connecting the common winding when it is desired to provide a reduced voltage mode for energy savings. However, in the configuration in which the common winding is disconnected from the series winding, the aforementioned switches of the present invention connect the common winding at each end to the bucking coil winding, while simultaneously disconnecting the common winding from the series winding of the autotransformer. Although this is a simple solution to the aforementioned problems, it is also an elegant one which essentially overcomes the disadvantage of the prior art patent disclosure and enables one to achieve the important advantages described therein.

OBJECTS OF THE INVENTION

It is therefore a principal object of the present invention to provide an improved voltage reduction apparatus for reducing power consumption in loads such as a bank of fluorescent lights and which obviates the disadvantageous prior art problem of harmonic distortion in the full voltage output mode.

It is a further object of the present invention to provide an improved voltage reduction apparatus for reducing power consumption in loads such as a plurality of fluorescent or HID lights and which obviates the disadvantageous problem of the prior art in which the metal structure of an autotransformer utilized in the invention is heated by the induced magnetic field of a disconnected winding.

It is still a further object of the present invention to provide an improved voltage reduction apparatus for decreasing power consumption in a load by selectively switching from a full voltage mode to a reduced voltage mode, implemented by an autotransformer having a series winding, a common winding and a bucking coil winding, the latter two windings being connected in parallel opposed configuration to prevent inadvertent and detrimental magnetic field induced effects during the high voltage mode.

BRIEF DESCRIPTION OF THE DRAWINGS

The aforementioned objects and advantages of the present invention, as well as additional objects and advantages thereof, will be more fully understood hereinafter as the result of a detailed description of a preferred embodiment when taken in conjunction with the accompanying drawings in which.

DETAILED DESCRIPTION OF A PREFERRED EMBODIMENT

Figure 1:
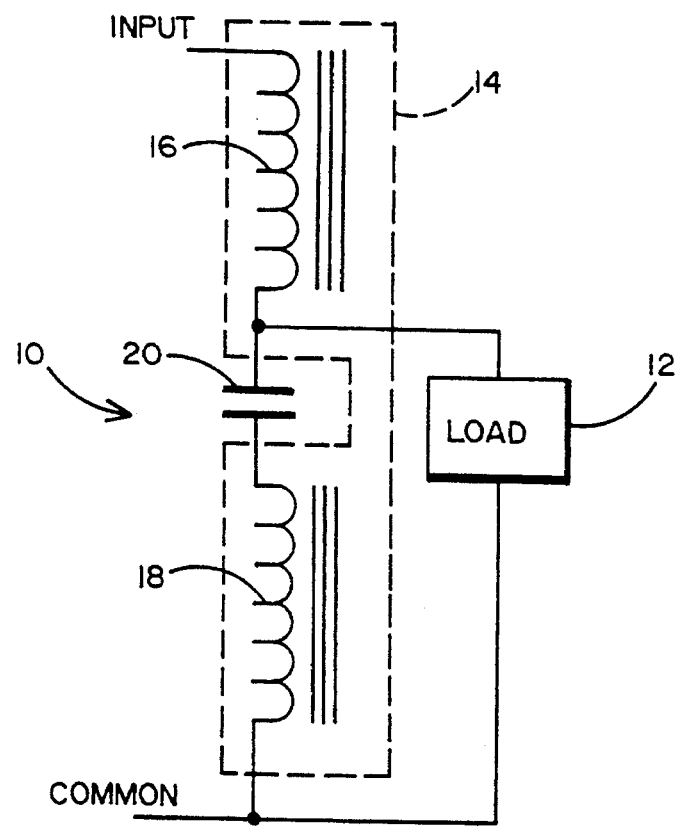
FIGS. 1 is a schematic illustration of the prior art autotransformer implemented apparatus of U.S. Pat. No. 4,431,948 which will be described herein by way of background and to which the improvement of the present invention is directed.

By way of background and for a more full understanding of the improvement provided by the present invention, reference will be made first to FIG. 1, which illustrates the underlying invention to which the improvement hereof is directed. As shown therein, a voltage reduction apparatus 10 of the prior art is shown connected to a load 12, in order to deliver alternating current power to the load, which in the configuration illustrated, is delivered between an input line and a common or neutral line. The apparatus for reducing power comprises an autotransformer 14 which includes a series winding 16 and a common winding 18 and between which there is serially connected a relay 20 or other equivalent switching device.

The series winding 16 is connected to the input of the AC source at one end thereof and the other end of the series winding is connected to the load 12. The common winding 18 and the relay or equivalent switching device 20 are connected across the load between the series winding and common or AC neutral. When the relay is open, substantially full input voltage is applied to the load with a slight drop in voltage resulting from the impedance of the series winding 16 of the autotransformer 14 which drop is very small and does not substantially affect the voltage at the load. When it is desired to reduce the voltage to the load, the relay 20 is closed, which permits current to flow in the common winding 18 and thus reduces the voltage to the load, based upon the voltage dividing effect of the respective winding 16 and 18.

The significant advantage of this prior art circuit for reducing voltage to a load is that the relay 20 or equivalent switch is not in the direct flow of load current and can be therefore of low current rating and smaller size and cost as compared to earlier prior art. Although the prior art circuit of FIG. 1 is feasible for reducing power consumption to a load in a variety of applications, one of its principal functions is to be used in conjunction with a bank of arc type lights, such as fluorescent lights which need a higher voltage to provide an adequate starting current, but can then be operated at substantially lower voltage without any significant reduction in light generation. Consequently, the circuit of FIG. 1 provides a significant advantage from a cost saving standpoint, both in the reduction of load consumption, such as in a bank of fluorescent lights, as well as in the current rating of the relay or equivalent switching device 20.

Unfortunately as previously indicated, the prior art circuit of FIG. 1, in its full voltage mode, which occurs when relay 20 is open, produced a significant disadvantage, resulting from the magnetic field interaction between the series winding 16 and the common winding 18 even when the common winding was electrically disconnected from the circuit. This disadvantage as previously described, relates to the problem of magnetic field heat induction in the metal structure of the autotransformer 14, due to the high magnetic field and also to the induction of harmonics in the electrical alternating current through series winding 16. The latter problem is associated with the magnetically induced voltage that is produced in the common winding 18, despite the fact that the winding is disconnected from the series winding 16. The resulting interaction produces a large number of high frequency harmonics in the series winding 16 in its full voltage mode, which significantly distorts the sinewave therethrough and effectively reduces the maximum voltage that can be delivered to the load in the full voltage mode. As a result and by way of example, in a 277 volt AC system where at least 270 volts are required to start a large bank of fluorescent lights, the harmonic distortion reduces the effective voltage to less than 260 volts, thereby making it impossible to activate the lights in a full voltage mode.

Figure 2:
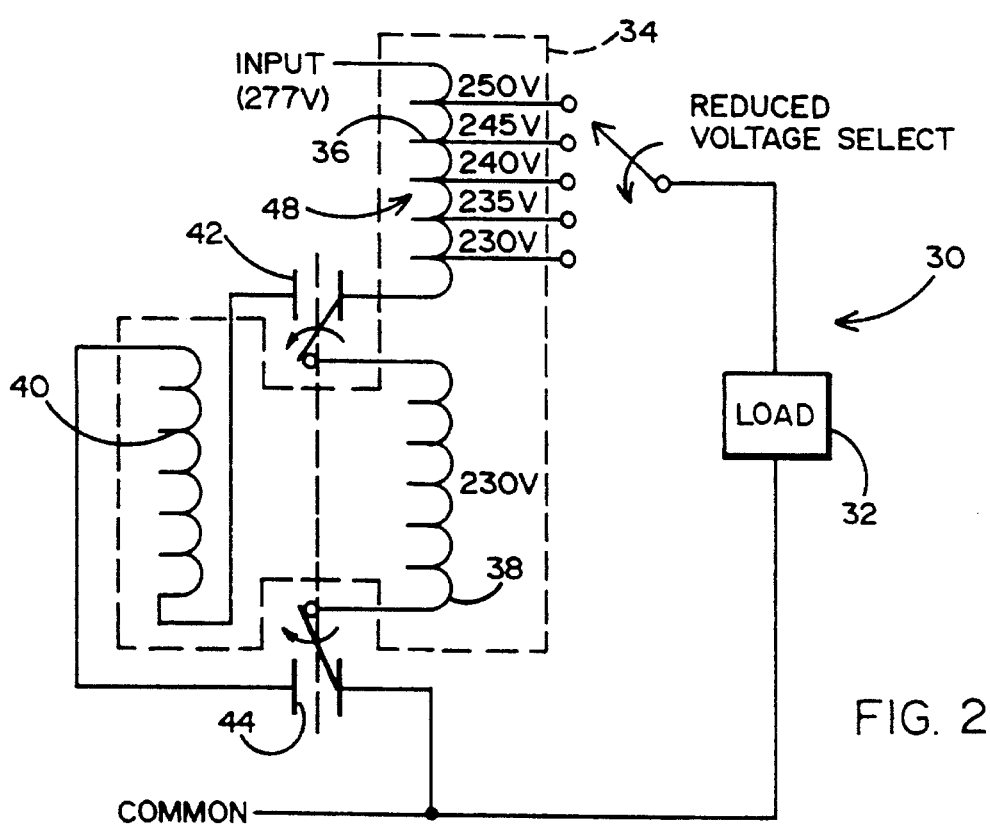
FIG. 2 illustrates the improved apparatus of the present invention shown configured in its voltage reduction mode.
Figure 3:
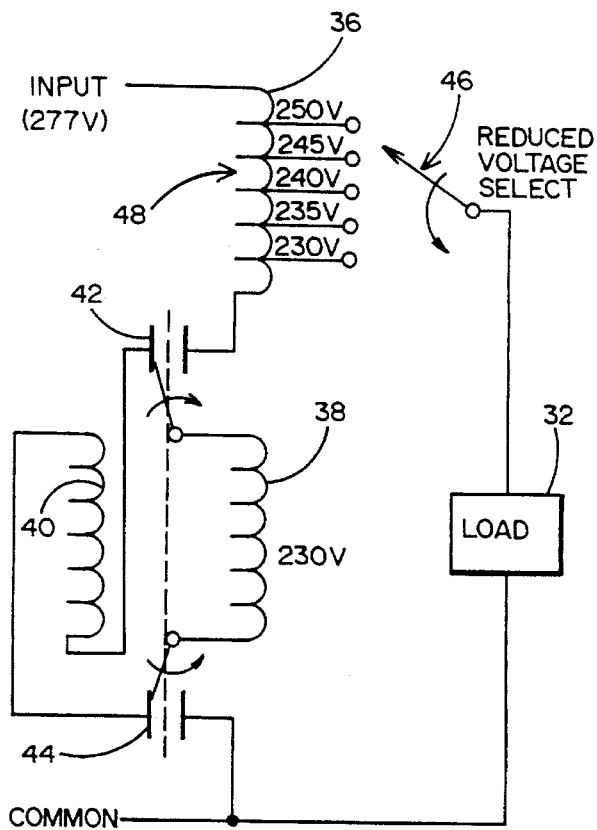
FIG. 3 illustrates the apparatus shown in FIG. 2, but in its full voltage mode.

The improvement provided by the present invention to overcome this implementation problem may be understood best by referring now to FIGS. 2 and 3. Both FIGS. 2 and 3 illustrate the circuit of the present invention connected between an input and a load in a manner similar to the configuration shown in the circuit of FIG. 1. FIG. 2 illustrates this configuration in a voltage reduction mode and FIG. 3 illustrates the same configuration in a full voltage mode.

Thus, it will be seen that the improved voltage reduction apparatus 30 of the present invention is connected to a load 32 to deliver an alternating current voltage thereto between an input and a common or neutral in a manner similar to that of FIG. 1. Also similar to FIG. 1 is the provision in the improved apparatus 30 of an autotransformer 34 having a series winding 36 and a common winding 38. Also provided therein is a relay or other equivalent switching device 42 which is switched to either connect or disconnect the series winding 36 and the common winding 38, depending upon whether one is operating in a full voltage mode or a reduced voltage mode. However, unlike the circuit of FIG. 1, the present invention shown in FIGS. 2 and 3 employs a bucking coil winding 40 which is wound in bifilar and opposed relation to the common winding 38. Furthermore, unlike the prior art circuit of FIG. 1, the improved apparatus of FIGS. 2 and 3 provides a second relay or equivalent switching device 44 which is provided to either connect the load end of the common winding 38 to AC common or one end of the bucking coil winding 40.

Another difference between the circuits of FIGS. 1 and 2, is that the circuit of FIG. 2 shows the use of a plurality of taps 48, connected at respective locations along the series winding 36, as well as a selection switch 46 which is electrically configured to permit the loads to be connected to any one or more of the various series winding taps 48 simultaneously. Switch 46 and series winding taps 48 are provided to enable the circuit of FIG. 2 to provide a plurality of selectable reduced voltages to the load 32, the number and magnitude of such reduced voltages being determined by the number of taps and the relative position of each tap along the series winding 36. In the embodiment illustrated in FIGS. 2 and 3, five such taps are provided in a 277 volt input so that the reduced voltage can be anywhere between 230 and 250 volts in five volt increments. The taps 48 and the reduced voltage select switch 46 combine to provide an optional advantageous feature of the present invention but are not directed to the problem solving improvement described above, with regard to the prior art circuit of FIG. 1 and therefore need not be implemented in order to achieve the principal objects of the present invention as defined herein above.

Returning now the bucking coil aspect of the present invention, it will be seen in FIG. 2 that when the improved apparatus of the invention is configured for operation in a reduced voltage mode, switches 42 and 44, which by way of example, may be portions of a unitary, double pull, double throw switch, are configured to connect the series winding 36 to the common winding 38, which is essentially equivalent to the circuit of FIG. 1 when the switch 20 therein is closed. In this reduced voltage configuration, the bucking coil winding 40 is completely disconnected from the circuit and provides no function whatsoever. However, as seen in FIG. 3, when the improved apparatus of the present invention is operated in its full voltage mode, the common winding 38 is electrically disconnected from the series winding 36. Furthermore, the common winding 38 is also disconnected from the load 32 and instead switches 42 and 44 connect the common winding 38 to the bucking coil winding 40 in a parallel configuration. Of course it will be understood that the parallel combination of common winding 38 and bucking coil winding 40 are electrically disconnected from the load 32 and from the series winding 36 and therefore do not function in the circuit of FIG. 3. Furthermore, because of the bifilar opposed winding configuration of the windings 38 and 40, the detrimental magnetic effects previously described, with respect to the prior art of FIG. 1, are also precluded in the present invention. Any voltage induced in the common winding 38, by the magnetic field interaction between the series winding 36 and the common winding 38, are countered or effectively cancelled by the equal and opposite voltage generation in the bucking coil winding 40. Furthermore, the magnetically induced heating of the metal structure of the autotransformer 34 is effectively eliminated by the use of a bucking coil winding 40 because the opposed winding configuration of the bucking coil effectively reduces the magnetic field below saturation in the autotransformer. Saturation is the condition that occurred in the prior art configuration of FIG. 1 in the full voltage mode. Thus it can be seen that the use of a bucking coil winding 40 in the manner disclosed in FIGS. 2 and 3, effectively overcomes the problems associated with the prior art configuration of FIG. 1 and the aforementioned U.S. Pat. No. 4,431,948.

Figure 4:
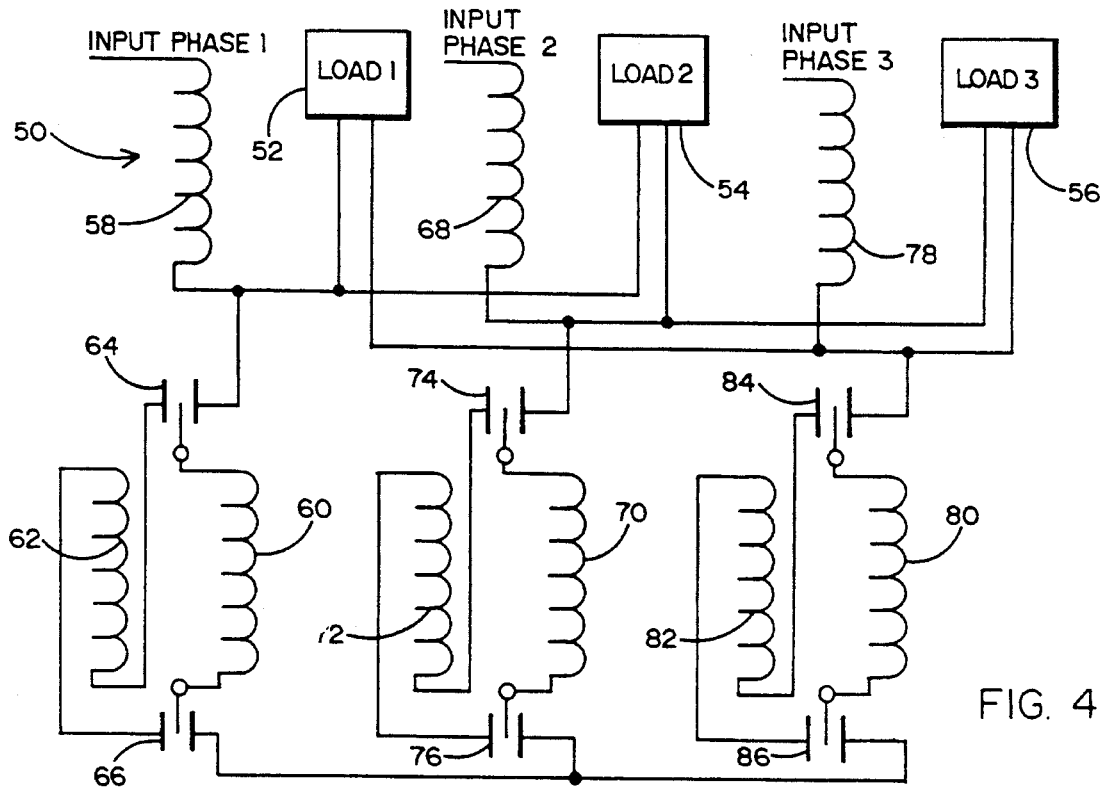
FIG. 4 is a schematic illustration of a three phase configuration of the improved apparatus of the present invention indicating multiple line to line load connections thereof.

It will be understood of course that the configuration shown in FIGS. 2 and 3 may be utilized in alternative embodiments, including embodiments in which the load is connected in a line to line configuration as opposed to a line to common configuration shown therein. By way of example, reference will now be made to FIG. 4 which illustrates a three phase embodiment 50 of the present invention in which three preferably balanced loads 52, 54 and 56 are each connected at respective line to line connections of a three phase configuration wherein each phase uses is the bucking coil winding concept of the present invention. More specifically, as seen in FIG. 4, input phase 1 is connected to a series winding 58, which is in turn connected to a common winding 60 and a bucking coil winding 62 through a relay or equivalent switching device 64. A second relay or equivalent switching device 66 connects the lower end of the common winding 60 to a floating neutral 88. Similarly, input phase 2 is connected to a series winding 68 which is connected in turn to a common winding 70 and bucking coil winding 72, through a relay or equivalent switching device 74. A second relay or equivalent switching device 76 connects the second phase voltage return device to the common floating neutral 88. Similarly, input phase 3 is connected to a series winding 78, which is in turn connected to a common winding 80 and a bucking coil 82, through a relay or equivalent switching device 84. A second relay or equivalent switching device 86 connects the input phase 3 voltage reduction circuit to a common floating neutral 88. In each of the aforementioned phases of the circuit of FIG. 4, the switches 64 and 66 may be two portions of a double throw, double pull switch, as would be the case for switches 74 and 76, as well as for switches 84 and 86. Furthermore, it may be necessary to switch each such switch at an instant in time when the corresponding sinewave of that phase is crossing zero in order to avoid arcing in the transformers or other detrimental effects. This switching may be achieved with solid state relays.

Thus, it will now be understood that what has been disclosed herein comprises an improved voltage reduction apparatus specifically designed to overcome implementation problems of a prior art voltage reduction apparatus disclosed in U.S. Pat. No. 4,431,948. More specifically, the present invention is designed to overcome the problem of magnetic field flux induced harmonic distortion and heating associated with the prior art disclosure of the aforementioned patent which otherwise substantially detracted from the advantageous implementation thereof. More specifically the present invention, also provides a highly advantageous apparatus for reducing voltage to a load, after first providing a full magnitude of voltage thereto by the use of an autotransformer having a series winding and a common winding disconnectable and connectable to one another by means of a relay or other equivalent switching device. However, it also provides a bucking coil winding in parallel with the common winding and wound in bifilar opposed relation thereto. This bucking coil prevents harmonic distortion and heating effects of the prior art apparatus by effectively cancelling any magnetically induced voltage in the common winding. In addition, the improved apparatus of the present invention provides an additional switch or equivalent switching device which is interposed at the opposite end of the common winding in order to permit the common winding and bucking coil winding to be connected in parallel with each other, but completely disconnected electrically from the remaining portions of the circuit of the present invention in the full voltage mode.

Those having skill in the art to which the present invention pertains, will now as a result of the applicant's teaching herein, perceive various modifications and additions which may be made to the invention. By way of example, it may be possible to overcome the aforementioned disadvantages of the prior art by using an alternatively configured bucking coil winding which may have different parameters from that described herein. Accordingly, all such modifications and additions are deemed to be within the scope of the invention which is to be limited only by the claims appended hereto and their equivalents.

I claim:

1. An apparatus for selectively reducing the voltage applied from an input to a load in an AC power system; the apparatus comprising:

an autotransformer having a series winding, a common winding and a bucking coil winding, the series winding being connected between said input and said load and the common winding being connected between said series winding and said load; and a pair of double pole switching devices, one said device connected respectively to a first end of said common winding and to a first end of said bucking coil winding, and the other said device connected to a second end of said common winding and to a second end of said bucking coil winding;

said switching devices being configured for connecting said common winding to said series winding and disconnecting said common winding from said bucking coil winding in a first position and for disconnecting said common winding to said series winding and connecting said common winding to said bucking coil winding in a second position;

said common winding and said bucking coil windings being configured relative to one another to generate substantially equal and opposite polarity voltages in response to magnetic field excitation.

2. The apparatus recited in claim 1 wherein said common winding and said bucking coil winding have a substantially equal number of winding turns and are connecting in opposing relation when said switching devices are in said second position.

3. The apparatus recited in claim 1 wherein said common winding and said bucking coil winding are respective windings of a bifilar coil and are connected in opposed relation when said switching devices are in said second position.

4. The apparatus recited in claim 1 wherein said pair of double pole switching devices are respective portions of a unitary double pole double throw switch.

5. The apparatus recited in claim 1 herein said pair of double pole switching devices comprise electrically actuatable relays.

6. The apparatus recited in claim 1 wherein said pair of double pole switching devices are respective portions of a double pole double throw relay.

7. The apparatus recited in claim 1 wherein said series winding comprises a plurality of winding taps and wherein said apparatus further comprises a multiple pole switch interposed between said load and said taps for selectively connecting said load to at least one of said taps.

8. An apparatus having an autotransformer for selectively reducing the voltage applied from an input to a load in an AC power system; the autotransformer comprising:

a series winding;

a common winding; and a bucking coil winding;

all of said windings being provided on a common metal core; said common winding and said bucking coil winding being respective windings of a bifilar coil; and said apparatus further comprising a pair of double pole switches, said switches being configured for connecting said common winding to said series winding and disconnecting said common winding from said bucking coil winding in a first position and for disconnecting said common winding from said series winding and connecting said common winding in parallel to said bucking coil winding in a second position.

9. The apparatus recited in claim 8 wherein said switches comprise respective portions of a double pole double throw switch.

10. The apparatus recited in claim 9 wherein said double pole double throw switch is a relay.

* * * * *